United States Patent [19]
Thompson et al.

[11] Patent Number: 5,717,589
[45] Date of Patent: Feb. 10, 1998

[54] SYSTEM AND METHOD PROVIDING FOR REAL-TIME WEATHER TRACKING AND STORM MOVEMENT PREDICTION

[75] Inventors: Thomas S. Thompson, Athens; Robert O. Baron, Sr., Huntsville, both of Ala.

[73] Assignee: Baron Services, Inc., Huntsville, Ala.

[21] Appl. No.: 418,819

[22] Filed: Apr. 7, 1995

[51] Int. Cl.⁶ .................................................. G06F 169/00
[52] U.S. Cl. .................................................. 364/420
[58] Field of Search .................................................. 364/420

[56] References Cited

U.S. PATENT DOCUMENTS

| | | | |
|---|---|---|---|
| 4,277,845 | 7/1981 | Smith et al. | 455/52 |
| 4,347,618 | 8/1982 | Kavouras et al. | 375/37 |
| 4,521,857 | 6/1985 | Reynolds, III | 364/420 |
| 5,379,215 | 1/1995 | Kruhoeffer et al. | 364/420 |
| 5,432,895 | 7/1995 | Myers | 395/119 |
| 5,517,193 | 5/1996 | Allison et al. | 364/420 |
| 5,583,972 | 12/1996 | Miller | 395/119 |

*Primary Examiner*—Donald E. McElheny, Jr.
*Attorney, Agent, or Firm*—Lanier, Ford, Shaver & Payne

[57] ABSTRACT

The subject invention provides a real-time weather tracking system and a method for tracking and predicting the future movements of significant weather, said method consisting of the following steps: integration of real-time weather data from different sources, communication of the integrated data to remote users, combining the integrated data with geographical information for display purposes, displaying the integrated real-time weather data and geographical information, and computing, predicting, and displaying the expected movements of significant weather, thus providing valuable information and notification to the users of the weather tracking system employing the disclosed method.

3 Claims, 3 Drawing Sheets

SYSTEM AND METHOD PROVIDING FOR REAL-TIME WEATHER TRACKING AND STORM MOVEMENT PREDICTION

BACKGROUND OF THE INVENTION

The present invention provides a method, and apparatus employing said method, for integrating real-time weather data gathered from various and different sources, for displaying the integrated weather data to users of the system in a geographical display format, for tracking and displaying the movements of significant weather, and for displaying the predicted path of significant weather cells.

The applicant is unfamiliar with any other currently available systems or methods which provide for the integration of the various weather-data sources as that of the present invention, or for the ability to display geographical and weather information in a manner equivalent to that of the present invention, or for the ability to track and predict movements of significant weather cells in a manner equivalent to that of the present invention.

SUMMARY OF THE INVENTION

Figure 1:
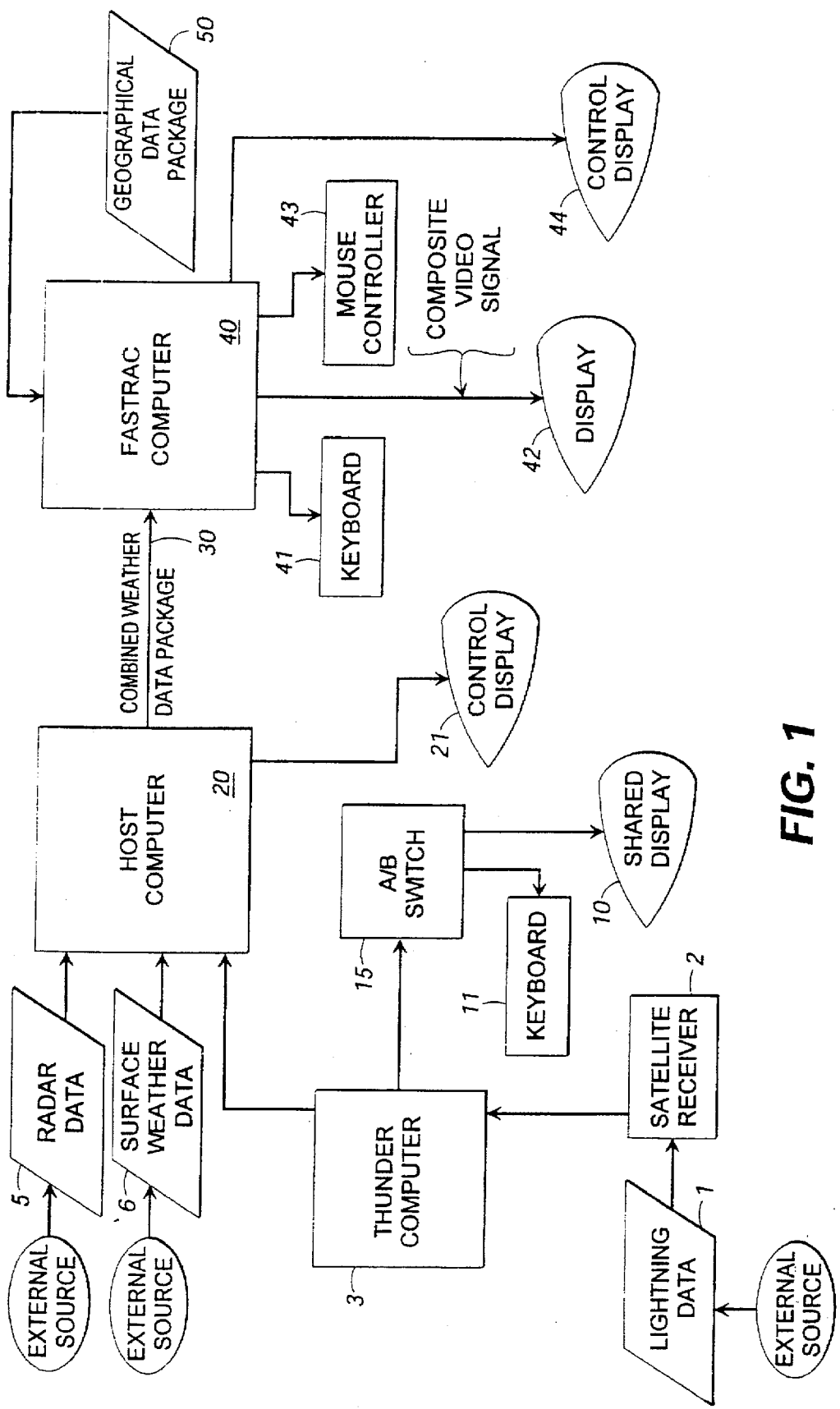
FIG. 1 is a representation of the data and function flow of the present invention.

Briefly stated, the present invention comprises a method for predicting an expected future path of movement of a weather cell in a geographic location, comprising the following steps: selecting a plurality of sources of real-time weather data for the geographic locations, receiving the real-time weather data from each of the selected plurality of sources, combining the received real-time weather data to create an integrated weather data package, storing the integrated weather data packages in memory, creating a geographical data package for the geographic location, combining the geographical data package with the integrated weather data package to provide a visual representation of real-time weather conditions for the geographic location, selecting a weather cell in the visual and representation, and then determining and displaying an expected future path of the weather cell using a plurality of the integrated weather data packages stored in memory over a period of time.

DETAILED DESCRIPTION OF THE INVENTION

The present invention uses and communicates with many external sources of weather data and information for its input data. The invention is capable of using input data from sources in addition to those it uses at the present time, and should therefore not be limited solely to the data sources employed to-date.

The categories of weather data which are integrated in the present invention include:

lightning strike data and geographical positioning of lighting strikes doppler velocities data doppler radar radar intensity rain data, including speed and direction at various altitudes rainfall and other precipitation rain density data, including gradations of rain density solar radiation temperature dew point barometric pressure humidity The particular sources of weather data employed by the present invention include:

Any radar source, including NEXRAD doppler radar data

GDS lighting strike data

Surface weather data from various surface weather stations

The present invention has the capability to display to the user various real-time weather information, including radar, lightning, and surface weather information. Lightning data 1 is received from an external source by a satellite receiver 2 and is routed to a computer referred to as the THUNDER® Computer 3 manufactured by Global Atmospherics, Ariz., U.S.A. The lightning data 1 includes the information that a lightning strike has occurred and the geographical position of the lightning strike. The Thunder Computer 3 can display current lightning data and can also store and archive said lightning data for playback of historical lightning information at a later date. The Thunder Computer 3 displays its lightning information on a shared video display 10 which it shares with the Host computer 20. The shared video display 10 and a shared keyboard 11 are accessed by either the Thunder Computer 3 or the Host Computer 20 by the manipulation of an A/B Switch 15. In addition to the shared display 10, the Host Computer 20 also accesses a separate control display 21 which functions as the control monitor for the Host Computer 20.

Radar data 5 is received from an external source and forwarded to the Host Computer 20. Surface weather data 6 is received from external sources and is forwarded to the Host Computer 20. The lightning data 1, radar data 5, and surface weather data 6 are combined by the Host computer 20 into a combined weather data package 30, which is forwarded to the FASTRAC® Computer 40, manufactured by Baron Services, Inc., Alabama, U.S.A.

The Host Computer 20 converts power reflection levels, derives velocity data, encodes the user-configured color levels, and compresses (RLL) for transmission to the FASTRAC® Computer 40.

The FASTRAC® Computer 40 is capable of generating geographical displays for particular geographic areas of interest from a preloaded geographical data package 50. The FASTRAC® Computer 40 has a dedicated keyboard 41, a video display 42, and mouse controller 43 associated with it. The geographical display generating function of the FASTRAC® computer includes the capability to show visual representations of, among other things, topography, rivers, roads, city streets, county boundaries, state boundaries, and city names. The FASTRAC® Computer 40 combines the weather information received from the Host Computer 20 with the geographical display capability and converts them into a composite video signal 60. The composite video signal 60, when routed to the video display 42, will provide a display of real-time weather conditions for particular geographic areas. The FASTRAC® Computer 40 also has associated with it a control display 44.

The FASTRAC® Computer 40 also archives its output for retrieval, sequencing, and playback at a later time. The archival or storage function has the capability to store in memory the digitized results of a certain number of radar sweeps and can recall and display those sweeps upon request. Older radar sweeps are also capable of being stored in specific radar files. This gives the system the capability to display weather radar returns from time intervals and to compute the change in position and change in directional movement of a particular storm cell over the time interval, and from that computation to interpolate or predict the storm cell's position at a time into the future. This function is referred to as the AutoTrac function. The system can recreate a storm's movement over the last minutes, hours, or days. It can also recall historical storm and storm movement history for the purpose of comparison to current storms. This function allows for the display of a storm's dynamic history.

The FASTRAC® Computer has the capability, with respect to a particular depicted weather mass (i.e., significant weather cell, or weather storm), to determine the expected future path of movement of that weather mass and to display to the viewer of the display 42 the path of expected travel, the cities with which the particular weather mass is expected to come into contact, and the estimated times of arrival at those cities. The system can also display the geography in a "zoom-in" or "zoom-out" fashion so as to show the roads and streets over which the particular weather mass is expected to cross.

Figure 2:
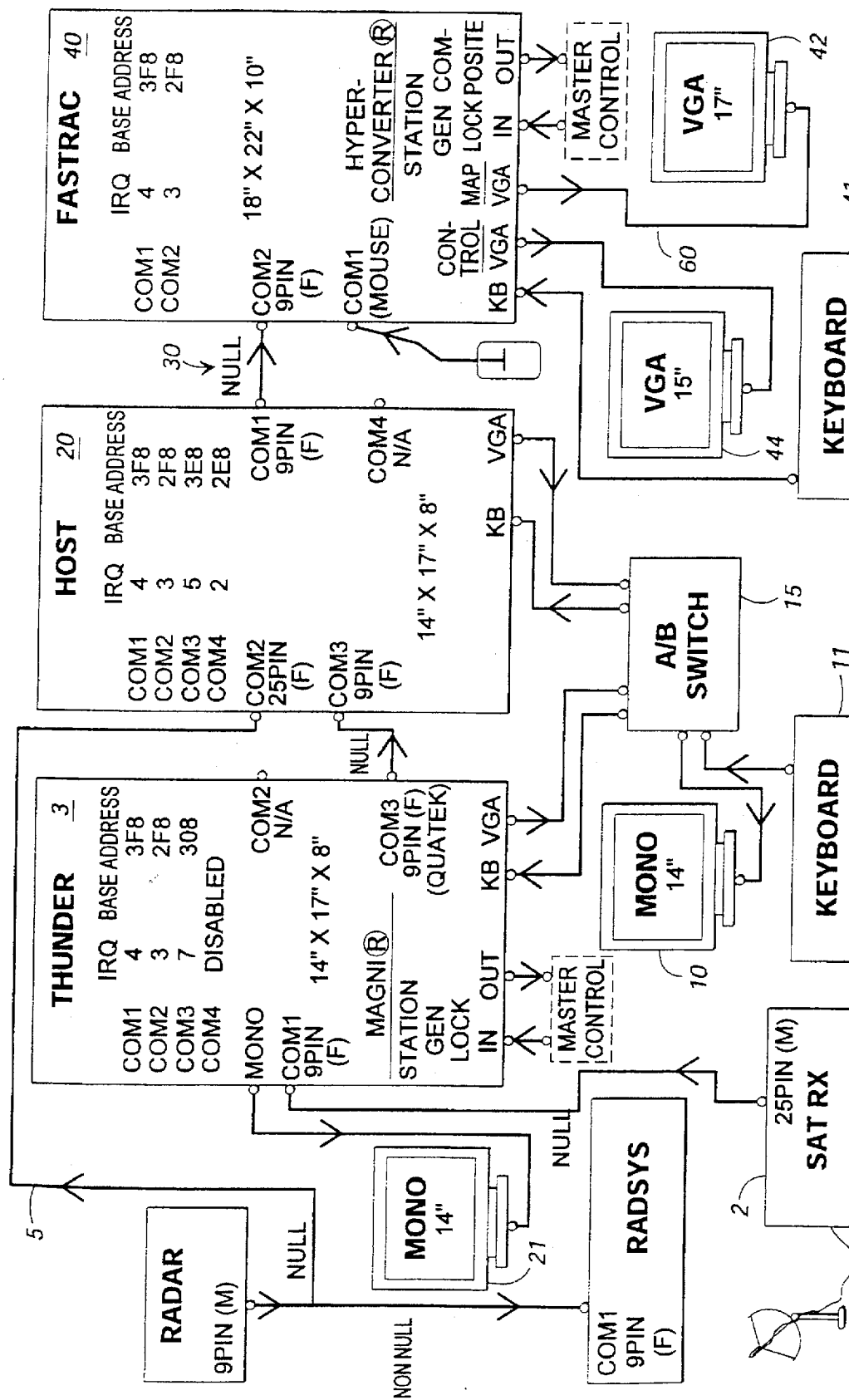
FIG. 2 is a more detailed representation of the data and function flow of the present invention.
Figure 3:
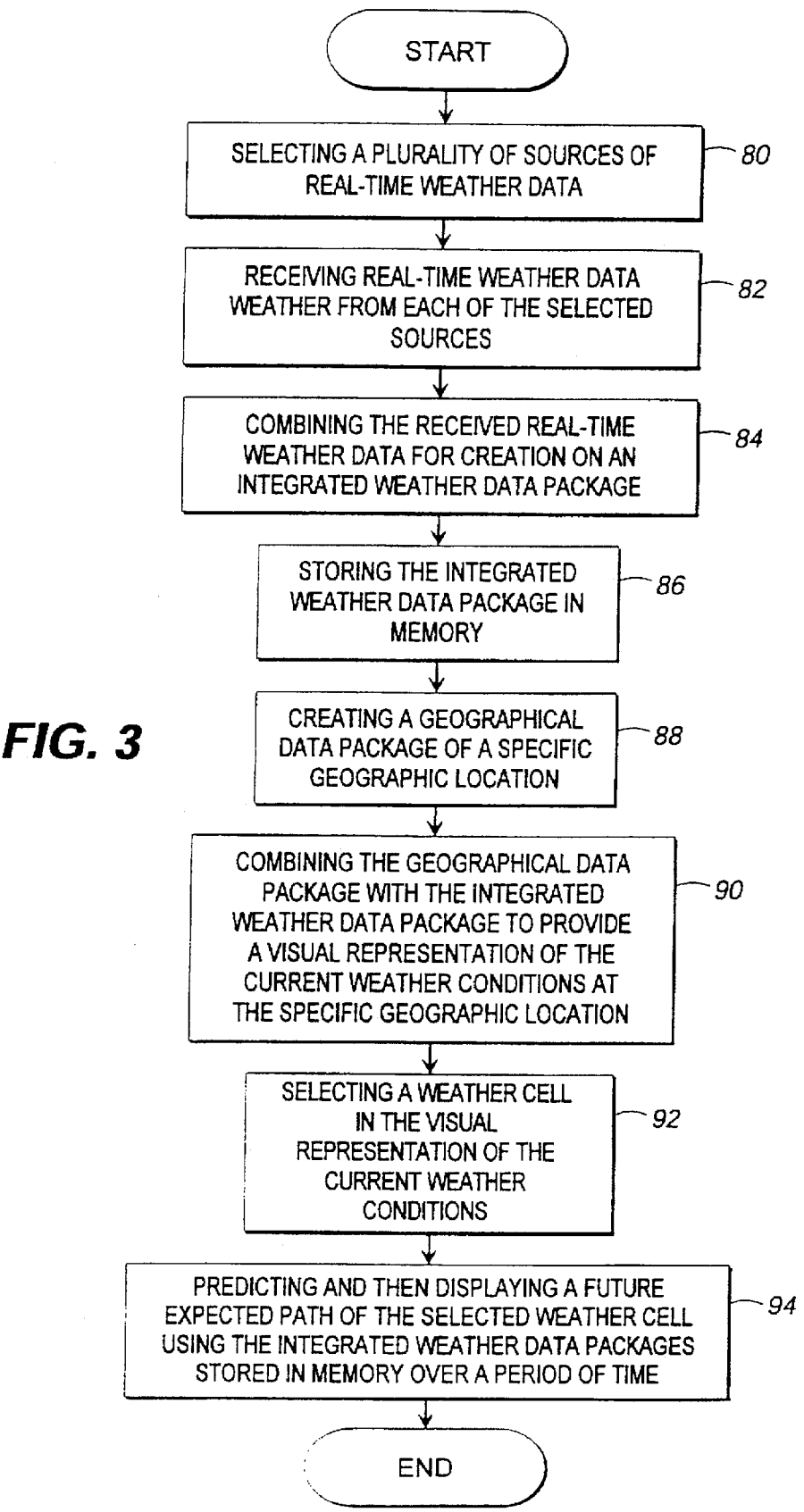
FIG. 3 is a flowchart of the operation of the present invention.

With reference now to FIG. 3, the operation of the real-time weather tracking system illustrated in FIGS. 1 and 2 is provided. Initially at block 80, a plurality of sources of real-time weather data re selected. Next, at block 82, real-time data from each of the selected sources is received. At block 84, the received real-time weather data is combined to create an integrated weather data package. A geographical data package of a specific geographic location is created at block 88. The geographical data package and the integrated weather data package are combined at block 90 to provide a visual representation of the current weather conditions at the specific geographic location, Next at block 92 a weather cell in the visual representation is selected. Lastly, at Block 94, a future expected path of the selected weather cell is predicted and the displayed using the integrated weather data packages stored in memory over a period of time.

We claim:

1. A computer-based method for predicting an expected future path of movement of a weather cell in a geographic location, comprising the steps of:

selecting a plurality of sources of real-time weather data for the geographic location;

receiving said real-time weather data from each of the selected plurality of said sources;

combining said received real-time weather data to create an integrated weather data package;

storing said integrated weather data packages in memory;

creating a geographical data package for the geographic location;

combining said geographical data package with said integrated weather data package to provide a visual representation of real-time weather conditions for the geographic location;

selecting a weather cell in said visual representation;

determining said expected future path of said weather cell using a plurality of said integrated weather data packages stored in memory over a period of time;

displaying said weather cell on a video display.

2. The method of claim 1, further comprising the steps of:

selecting a first location in the geographic location; and determining an estimated time of arrival of said weather cell at said first location.

3. The method of claim 1, further comprising the step of comparing said integrated weather data packages with real-time storm data.

* * * * *